Figure 1:
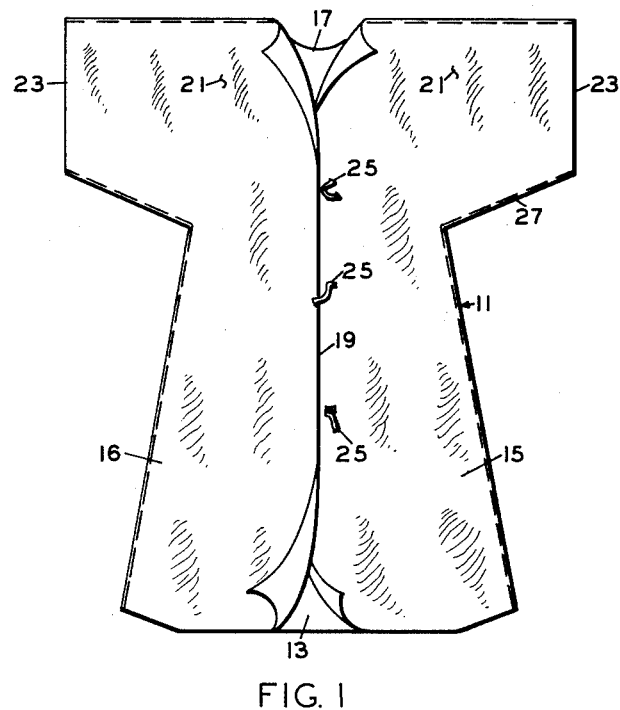

Nov. 17, 1964   J. J. GRIMM ETAL   3,156,927
METHOD AND APPARATUS FOR MANUFACTURING GARMENTS
Filed Aug. 25, 1961   6 Sheets-Sheet 1

INVENTORS
JAMES J. GRIMM
DONALD R. FORRY
BY
ATTORNEYS

Nov. 17, 1964    J. J. GRIMM ETAL    3,156,927
METHOD AND APPARATUS FOR MANUFACTURING GARMENTS
Filed Aug. 25, 1961    6 Sheets-Sheet 4

INVENTORS
JAMES J. GRIMM
DONALD R. FORRY
BY *Gray, Mase*
*& Dunson*
ATTORNEYS

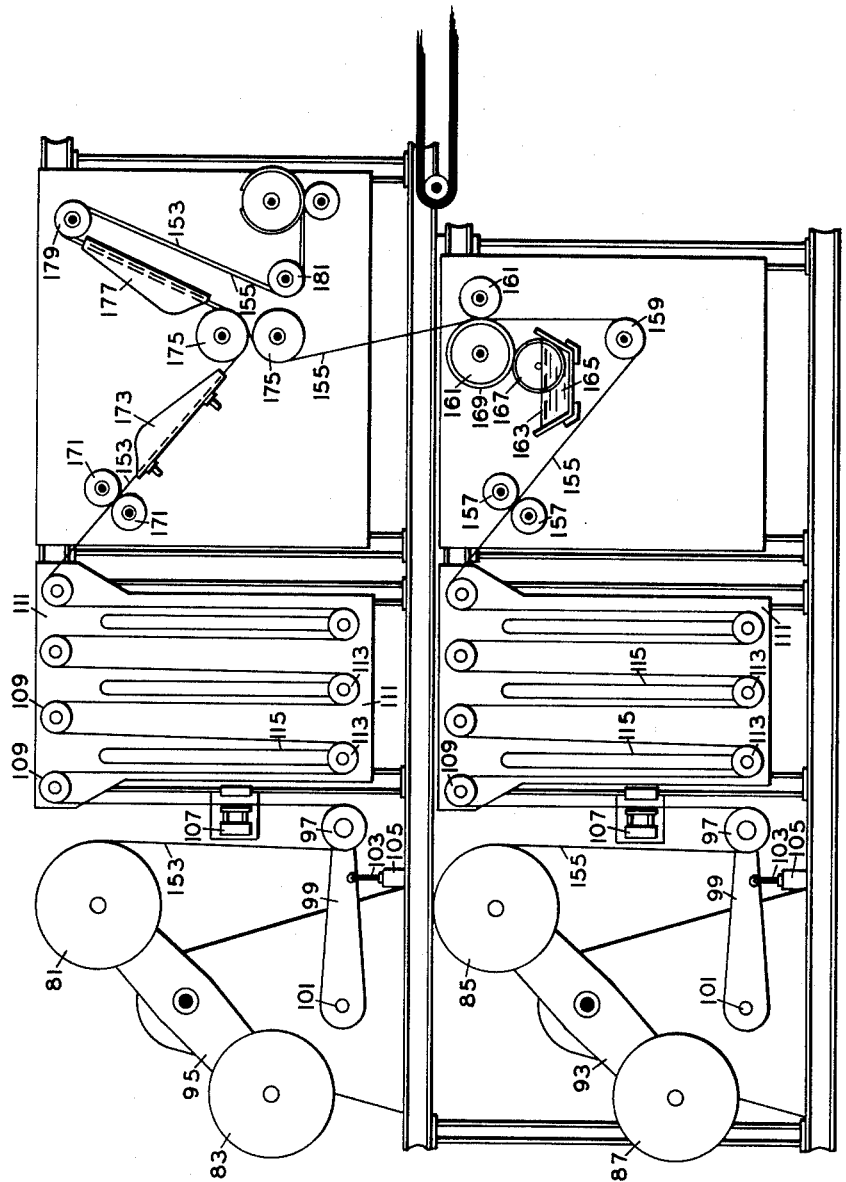

United States Patent Office 3,156,927
Patented Nov. 17, 1964

3,156,927
METHOD AND APPARATUS FOR MANU-
FACTURING GARMENTS
James J. Grimm, Columbus, and Donald R. Forry,
Hilliard, Ohio, assignors, by mesne assignments, to
Angelica Uniform Company, St. Louis, Mo., a corporation of Missouri
Filed Aug. 25, 1961, Ser. No. 133,955
10 Claims. (Cl. 2—243)

This invention relates to a method and apparatus for producing garments, and, more particularly, to a method for rapidly producing inexpensive garments, which, upon proper selection of material, may be disposed of after a single use.

Although many types and shapes of garments may be produced by the method herein described, such as robes, shirts, jackets, undershirts, including those having a cloth material, the present invention is concerned primarily with disposable garments that are usually manufactured from a paper or paperlike material.

The term "disposable garment" is used herein to designate articles of wearing apparel intended to be worn one or more times, until it has been soiled and then disposed of without laundering. Although the description that follows is primarily directed to a gown of the type usually worn in hospitals, it should be understood that many items of wearing apparel can be manufactured by the method and with the apparatus herein described.

The major present-day use for disposable garments is in doctors' offices, examination rooms, clinics, hospitals, or the like, where disrobing or partial disrobing is required, and a great number of garments are needed each day. Due to the sanitation standards, one garment cannot be used for two patients, and, since the garment is worn only a few hours, much of the expense of using permanent garments is incurred in the cost of laundering such garments. Many of the so-called present disposable garments are either too costly or are unsuitable because they do not fit well, in that they are made shapeless and many have undesirable and unnecessary openings.

Briefly described, this invention includes a method of producing garments, such as gowns and the like from continuous webs of garment material, by applying adhesive material to a first web in a pattern corresponding to the seams of the garment, laying a second web upon the first web so that the adhesive material on the first web adheres to the second web, and cutting around the outline of the garment to remove it from the webs.

This invention also includes apparatus for producing garments from two continuous webs of garment material comprising the combination of: means for supplying a first web and a second web; means for applying glue to the first web in a pattern corresponding to the seams of the garment; means for pressing the first web against the second web; and cutting means for severing the first and second webs in a pattern corresponding to the outline of the garment.

One of the advantages of the method of this invention is the elimination of much of the waste material from which the garments are manufactured. Another advantage is the elimination of many steps in the formation of the garment, allowing a garment to be manufactured with the minimum number of forming operations. Still another advantage of this invention is the provision of apparatus that transforms two continuous webs of material into a finished garment without interruption. Other advantages will become apparent from the description, drawings, and claims that follow.

Figure 2:
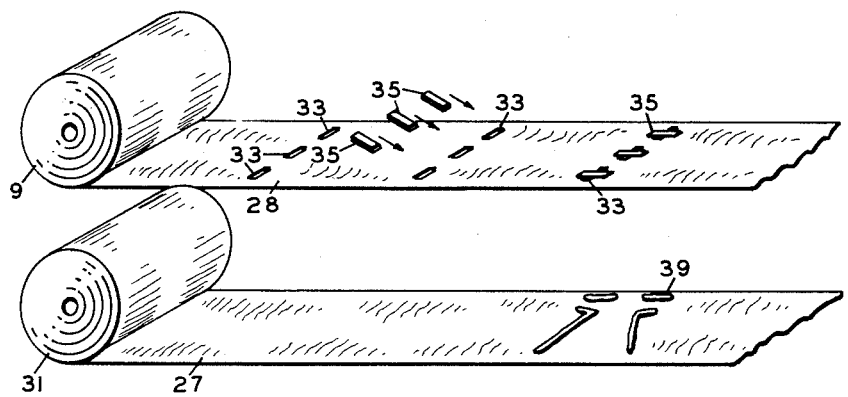
Figure 3:
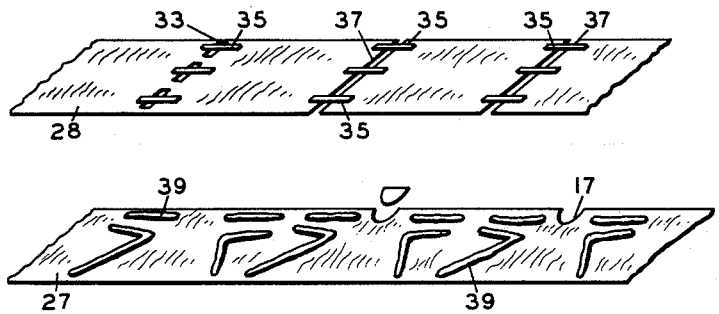
Figure 4:
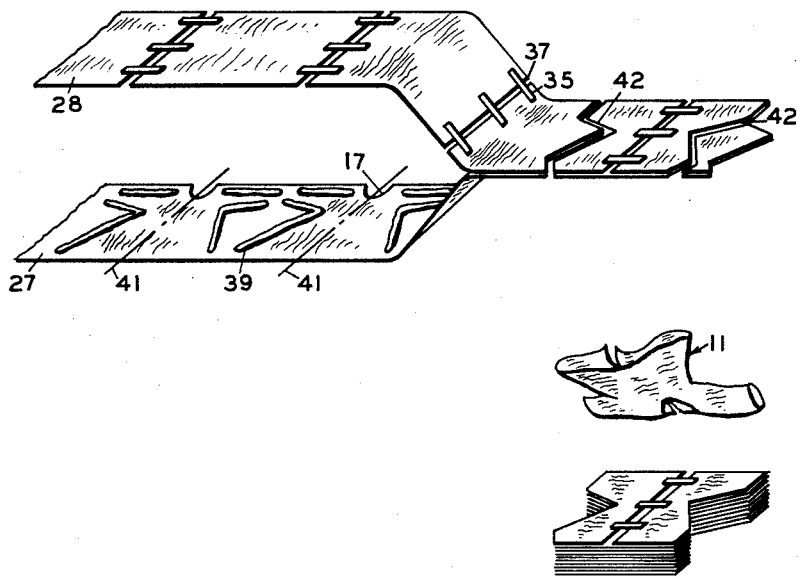
Figure 10:
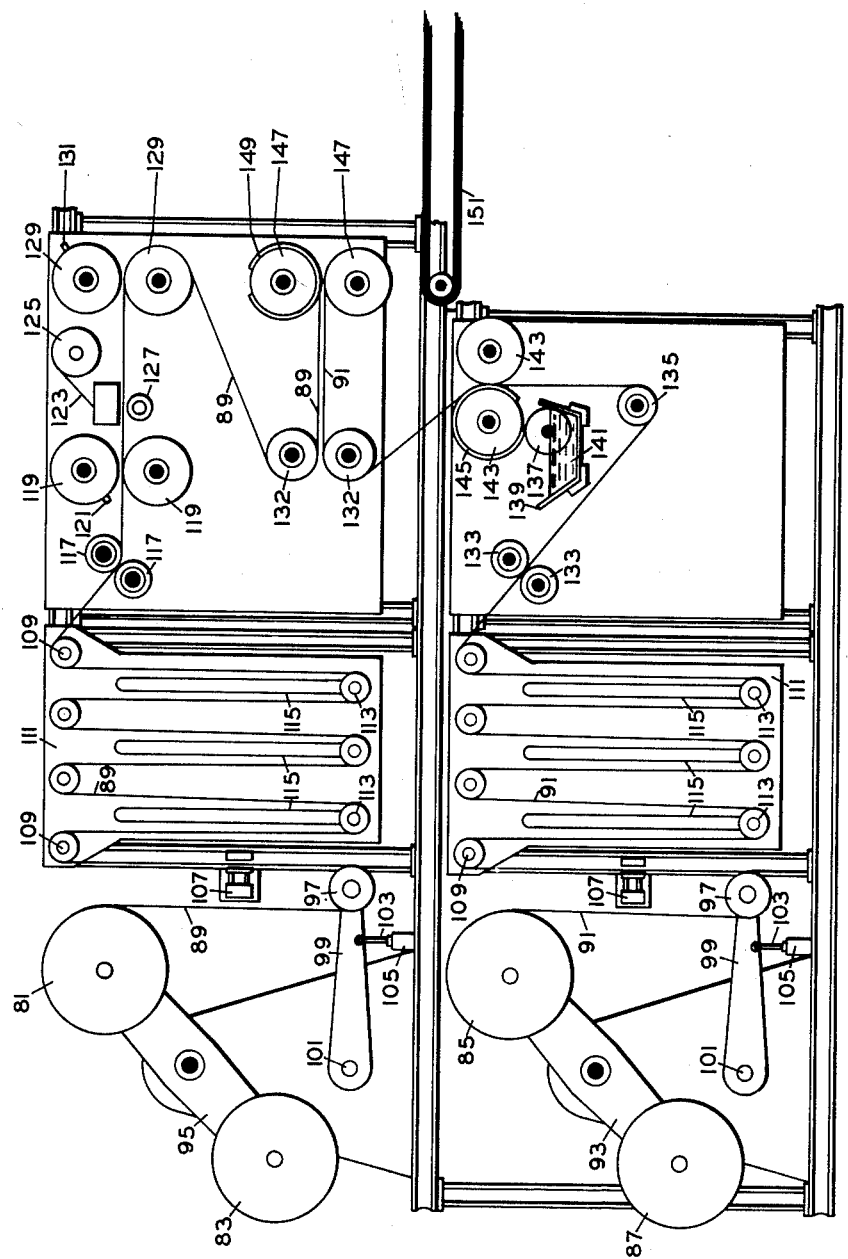

FIG. 1 is a view of the back of a typical garment, in accordance with this invention;

FIGS. 2, 3, and 4 are diagrammatic views showing various stages of garment formation, in accordance with the method of this invention;

FIGS. 5, 6, 7, 8, and 9 are diagrammatic views showing various alternative stages of gown formation, in accordance with the method of this invention;

FIG. 10 is a diagrammatic view of one embodiment of the apparatus of this invention; and FIG. 11 is a diagrammatic view of a second embodiment of the apparatus of this invention.

A typical disposable garment is shown in FIG. 1. It is a gown 11 comprising a front panel 13 and two half panels 15 and 16 that form the back. Except for the neck space 17 in the front panel 13, if the two half panels 15 and 16 that form the back were joined, they would match prefectly with the front panel 13; the back of the gown is formed in two half panels 15 and 16 in order to leave a vertical opening 19 the full length of the back of the gown 11. The gown 11 has a pair of sleeves 21—21, each with an opening 23 for the arms. Optional fasteners 25—25 may be provided to maintain the vertical opening 19 in closed position while the gown 11 is in use. Although the provision of the fasteners 25 is preferred, the fasteners 25 are not absolutely necessary to the gown, since adhesive tape is usually available in the establishments where the gowns 11 are most likely to be used and can be applied to the backs of the gowns 11 to hold the openings 19 closed. The seams 27 (indicated by the dotted lines) extend from the bottom of each arm opening 23 into the body of the gown and then to the bottom, and from each side of the neck 17 across the shoulders to the top of the arm opening 23.

FIGS. 2, 3, and 4 show the various stages in the production of a garment, especially suitable for the gown shown in FIG. 1. Two webs 27 and 28 of garment material are supplied from rolls of garment material 29 and 31. As herein described, web 28 is to become the back of the garment and web 27 the front of the garment, although, either web could become the front or the back of the garment. A plurality of slits 33—33 are formed substantially transversely (3 slits are preferred, as shown in the example, although more or less could be formed) in the web 28. Strips of tape 35—35 are applied over the slits 33—33 so that the slits 33—33 are essentially closed again by the strips of tape 35—35. Web 28 is then cut between the slits 33—33 (FIG. 3), forming a slit 37 completely across the web 28. The web 28 is now kept continuous by the strips of tape 35—35 that span the slit 37. Slit 37 corresponds to and would become the vertical opening 19 of the gown 11. While web 28 is being cut, adhesive material or glue 39 is applied to web 27. The glue 39 is applied to web 27 in a pattern corresponding to the seam lines of the garment that is to be manufactured. In the manufacture of the gown 11, the neck space 17 is removed along the edge of web 27 at the appropriate point established by the application of the glue 39. As shown in FIG. 4, webs 27 and 28, having received appropriate treatment, are pressed together so that the glue on web 27 adheres to web 28. As the webs 27 and 28 are pressed together, they are oriented with respect to each other so that the transverse slit 37 preferably falls on the center line 41 of the pattern of glue 39. Depending upon the nature of the adhesive material, the webs 27 and 28 can receive further treatment or they may be heated for a short period of time to "set" the glue. When the glue has dried sufficiently, the garments are cut from the webs 27 and 28 (FIG. 4) by cutting in a pattern corresponding to the outline 42 of the garment 11. The pattern of glue 39 is included within the cut so that the seams of the finished garment are held together by the glue.

FIGS. 5 through 9 show the various stages of manufacturing a garment from two continuous webs of garment material in which some of the steps are slightly different from some in the method just discussed. The result of the steps of this embodiment of the invention is to eliminate much of the waste in garment material by careful selection of the areas of the webs that are to form the garments so that portions of two different garments have common lines along which the garment is cut from the web, thereby eliminating any waste between two different garments cut from the same web. Thus, much cutting and trimming is eliminated since one stroke of the knife will cut along the outline of two different garments.

Figure 5:
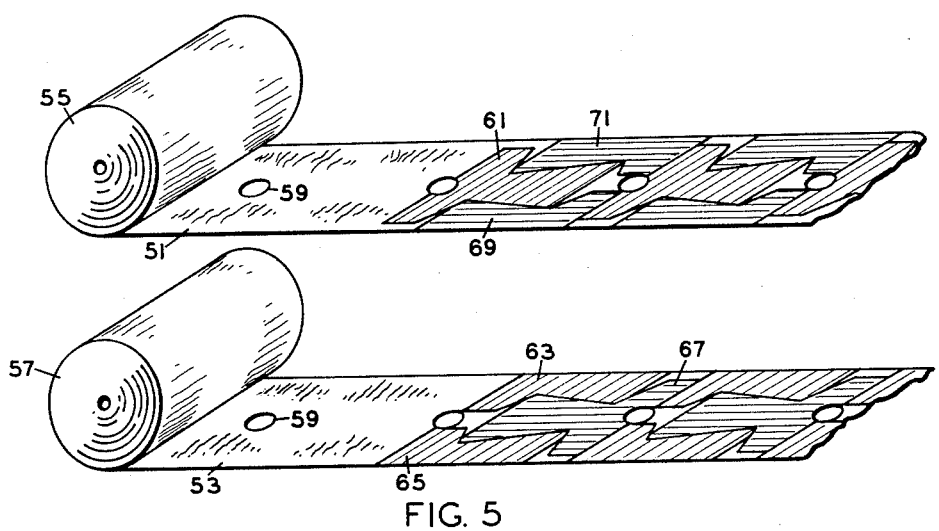

Two continuous webs of material 51 and 53 are taken from separate supply rolls 55 and 57 and both back and front panels for the garment come from both of the webs 51 and 53. In the preferred form of the invention, indexing holes 59—59 are punched along the center line of each web and are placed a selected distance apart which is the same on both webs 51 and 53. The indexing holes 59—59 eventually become a portion of the neck space 17 when the gown 11 is being manufactured. Two garments are cut from the space between two of these indexing holes 59—59 after the webs are placed together and the indexing holes are indexed with one another. Naturally, instead of indexing holes there may be other means of matching the webs 51 and 53 together properly, such as small notches along the side or by proper timing of apparatus that might be selected to perform the process herein described. FIG. 5 indicates the areas of each web from which the various panels of the gown will be cut. These are, of course, not marked out during the method but are marked in the drawing merely to indicate the eventual disposition of the various areas of each web 51 and 53. For example, area 61 on web 51 is eventually matched with areas 63 and 65 on web 53, to form a gown that will have the edges of web 53 as the back opening 19 of a gown 11. Area 67 on web 53 and areas 69 and 71 on web 51 are the front and back, respectively, of a second gown so that two complete gowns are cut from between a pair of indexing holes 59—59 when the webs 51 and 53 are mated together.

Figure 6:
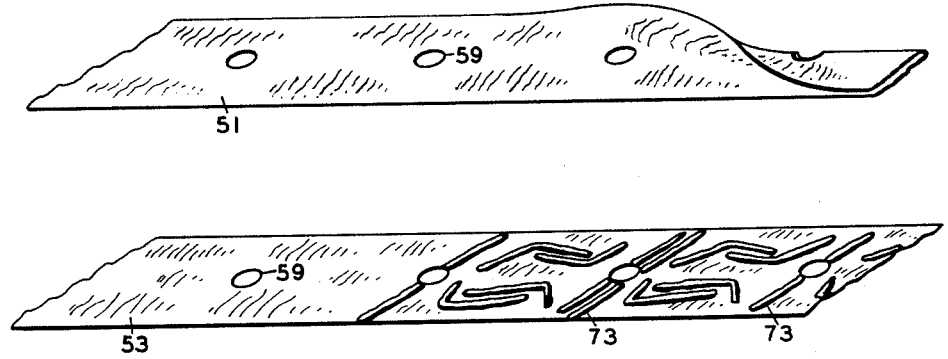
Figure 7:
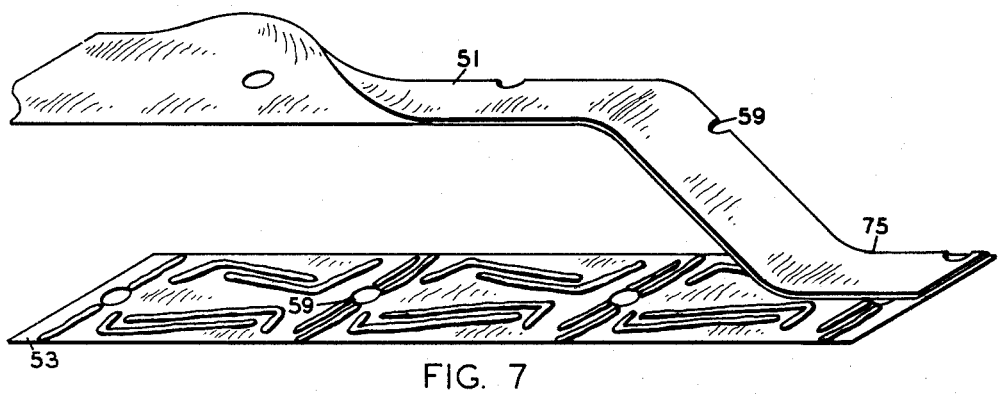
Figure 8:
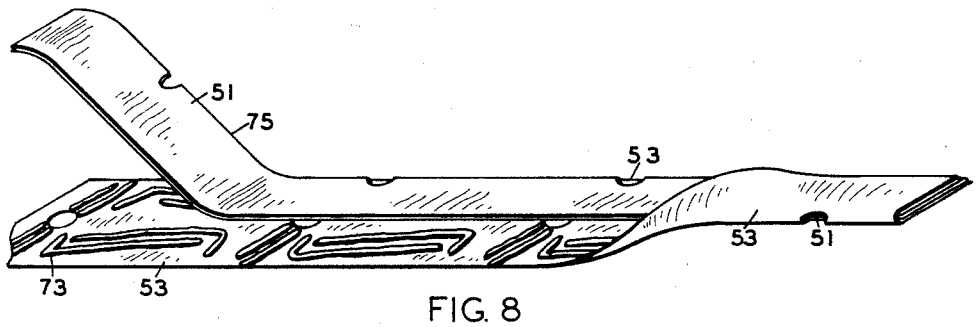
Figure 9:
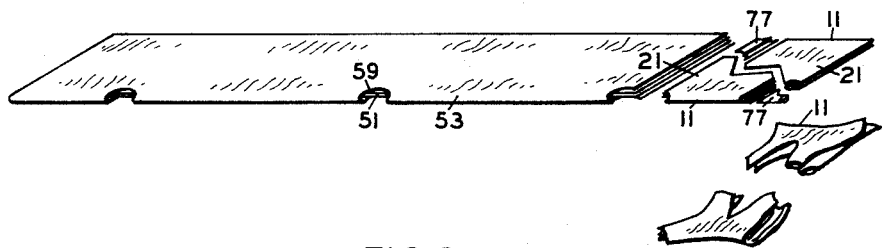

By proper folding and proper application of adhesive material, to webs 51 and 53, two complete gowns can be cut from a minimum amount of area on the webs 51 and 53, and yet this is done in such a manner that the gown is cut from the webs completely formed and it is not necessary to cut out the individual pieces of the gowns from the gown material and then fit them together. As shown in FIG. 6, web 51 is first folded along its mid-line and web 53 receives an adhesive material or glue in a pattern corresponding to one complete panel preferably centered on the mid-line of the web, with a half panel positioned on each side of the full panel and inverted with respect to the full panel. Folded web 51 is then brought together with web 53 containing the glue, so that the folded edge 75 is aligned with one edge of the web 53. In order that the indexing holes 59 on the web 51 have the proper relationship with the glue on web 53, the indexing holes 59—59 of both webs 51 and 53 are aligned on a line perpendicular to the edge of web 53 and passing through the center of the indexing hole 59 on web 53. The foregoing description is, by way of example, directed to the gown 11 shown in FIG. 1. Where the neck space 17 is unnecessary, indexing holes 59 may be omitted since the position of the garment panels on the first folded web is determined by the contact with the adhesive material on the glued web. The uncovered half of web 53 is then folded over folded web 51 and the four thicknesses of material are pressed together so that the glue 73 on web 53 adheres to web 51. The folded and glued webs 51 and 53 are then cut as shown in FIG. 9 so that two garments are obtained from between each of the selected points or indexing holes 59. The cut takes the form of the outline of two halves of the gown which leaves a little waste material 77 at the ends of each arm and below the bottoms of each gown 11. The gowns are cut from the webs in a folded condition and, since they occupy an end-for-end relationship, are "nested" together so that they may be readily packed in boxes.

FIG. 10 is a diagrammatic view of apparatus for manufacturing the garments described herein. The apparatus is intended to produce a completed garment, beginning with two continuous webs of material. Four rolls of material 81, 83, 85, and 87, are shown mounted on the apparatus. Two of the rolls 81 and 85 are presently supplying the webs 89 and 91 of garment material for the apparatus. The other two rolls 83 and 87 are held in reserve for splicing onto the webs 89 and 91 when the material is depleted on the rolls 81 and 85. The four material rolls, 81, 83, 85, and 87, are mounted on the ends of two rotatably mounted arms, 93 and 95, and either roll on the end of each arm, 93 and 95, may be moved into feed position by rotating the arms 93 and 95.

Each web 89 and 91 passes its supply roll (81 and 85, respectively) over a tension-sensing roll 97 rotatably mounted on an arm 99. The arm 99 is pivotally mounted on a bearing 101 and is held in position by the web tension. A rod 103 is attached to the arm 99 between the bearing 101 and the roll 97 and extends to a switch 105. When the web 89 or 91 breaks, or when the material on the roll 83 or 87 is exhausted, the tension on the web 89 fails to support the roller 97, so that the weight of the arm 99 pushes downward against the rod 103 and activates the switch 105. Activation of the switch 105 causes the web holder 107 to close, stopping the movement of the web 89 or 91 so that the end of the web is not lost in the machine.

In order to ensure that the apparatus continues to function during the time the web is being spliced, a festoon storage area is provided. A plurality of rotatably mounted rolls 109—109 is mounted at the top of a slotted frame 111. The web passes over the rolls 109—109 and beneath a plurality of rolls 113—113 slidably mounted in the slots 115—115. If there is a break in the web, material is taken from the festoon storage since the rolls 113—113 are free to rise in the slots 115—115. After the web is spliced, material can be supplied at a rate sufficient to fulfill the needs of the apparatus and to replace the festoon storage.

After web 89 passes from the festoon storage it passes between a pair of driving rolls 117—117. The driving rolls 117—117 are connected to power means (not shown) such as an electric motor. The power means is also connected by means such as belts (not shown) to other rolls hereinafter described (such as driving rolls 133—133, for example) that require power to move and maintain tension on the webs 89 and 91. The driving rolls 117—117 (likewise driving rolls 133—133) are responsible for pulling the web 89 from supply roll 81 and feeding it to the remainder of the machine. The web then passes between a first pair of cutting rolls 119—119 that have a plurality of small knives 121—121 attached to the surface of one of the rolls 119—119. The knives 121—121 are aligned so that a plurality of short slits is made in a transverse line across the web 89. The slits are bridged by tape 123 furnished from a supply roll 125, to a tape applying head 127 that cuts and applies strips of tape across the slits. Tape applying heads, such as tape applying head 127, are presently available on the market. An example is model S-601 manufactured by Minnesota Mining and Manufacturing Company. Cutting rolls 129—129, having a plurality of knives 131—131 attached to the surface of one of the rolls 129—129, complete the transverse cut across the web by cutting between the slits made by the first pair of cutting rolls 119—119. Additional tape may be added to the web near the transverse slit by tapes furnished from a supply roll to a tape applying head (not shown) that cuts and applies the strip of tape near the transverse slit. The additional tape is used as means for closing the gown when it is worn. Instead of tape, strips of gown material may be added or glued to each side of the transverse slit at this position in the machine and the material used as ties. Web 89 then passes to a pair of squeeze rolls 132—132 where it is joined with web 91.

Web 91 leaves the festoon storage and passes through the drive rolls 133—133. A guide roller 135 changes the direction of the web 91 to position it for the next operation. A roller 137 is partially immersed in a tank 139 containing glue 141 and passes the glue 141 to an embossment 145 provided on one of a pair of glue printing rolls 143—143. As the web 91 passes between the glue printing rolls 143—143, the embossed pattern 145 applies glue 141 to web 91 in a pattern that corresponds to the seams of the garment.

Web 91 then passes from the glue printing rolls 143—143 to the squeeze rolls 133—133 where it is united with web 89. The squeeze rolls 133—133 may be electrically heated to provide a better environment for drying the glue. Passing from the squeeze rolls 133—133, the two webs 89 and 91, now adhered together, are passed in between a set of rotary die cutting rolls 147—147. One of the die cutting rolls has knives 149 corresponding to the outline of the garment. The die cutting rolls 147—147 cut the finished garment from the webs 89 and 91 by cutting outside of or along the edge of the glue pattern.

A suitable conveyor 151, may be used to move the garments away from the machine so that they may be folded, boxed, etc.

FIG. 11 is a diagrammatic view of another embodiment of the apparatus for manufacturing garments described herein. Four rolls of material 81, 83, 85, and 87 are shown mounted on the apparatus. Webs 153 and 155 are supplied and spliced with the same apparatus as that of FIG. 10. Web 155 passes through driving rolls 157—157, over guide roll 159, and through glue printing rolls 161—161. Glue 163 is supplied from a tank 165 by means of a roll 167 to the embossment 169 of one of the printing rolls 161. The apparatus for the operations on web 155, before it is united with web 153 then, is (except for the pattern of the embossment 169 on the glue printing roll 161) much the same as the apparatus for operations on web 91 of FIG. 10 before it is united with web 89.

Web 153 passes through drive rolls 171—171 (drive rolls 157—157 and 171—171 are connected to power means, not shown, similar to rolls 117—117 and 133—133 in the apparatus shown in FIG. 10) and then through a first folding horn 173 where the web 153 is folded longitudinally along its mid-line. Web 153 is united with web 155 when it passes through squeeze rolls 175—175. The folding horns 173 and 177 (a common item in many machines for manufacturing paper articles) are shaped essentially like half of a cone. As any flat web of paper is moved along a folding horn, the outer edge of the web first comes in contact with the larger open end of the half cone. The imaginary axis of the cone is positioned at an angle to the longitudinal axis of the web so that the small opening or apex of the cone is located at the point where the crease or folded edge of the paper is desired. The edge of the web "rides" against the inside surface of the folding horn following the contour thereof so that a point positioned on the edge of the moving web travels essentially in a spiral. Eventually this point on the edge of the web comes to rest against the web surface or against the opposite edge of the web and such resting place depends upon the size of the folded portion desired. In this instance webs 153 and 155 are folded along their midline so that the opposite edges of the webs 153 and 155 are brought together.

Both webs 153 and 155 pass through a second folding horn 177 where the uncovered half of web 155 is folded over folded web 153. The combined folded webs 153 and 155 pass over guide rolls 179, 181 to a rotary die cutter which is shown in the form of rolls 183 and 185.

Roll 185 supports a plurality of knives 187—187 shaped in a pattern corresponding to two halves of a garment. Preferably the two halves have a common cutting line which reduces the amount of waste material.

It will be understood, of course, that, while the forms of the invention herein shown and described constitute the preferred embodiments of the invention, it is not intended herein to illustrate all the possible equivalent forms or ramifications of the invention. It will also be understood that the words used are words of description rather than limitation and that various changes, such as changes in shape, relative size, and arrangement of parts may be substituted without departing from the spirit or the scope of the invention herein disclosed.

What is claimed is:

1. A method of producing garments such as gowns and the like from continuous webs of material, comprising the steps of: applying adhesive material to a first web in a pattern corresponding to the seams of a garment; cutting a plurality of slits substantially transversely in a second web; bridging said slits with tape; cutting between said slits to complete a transverse cut across said second web; laying said first and second webs together so that the adhesive material of the first web adheres to the second web; and cutting around the outline of the garment to remove it from said webs.

2. A method of producing garments such as gowns and the like from continuous webs of garment material, comprising the steps of: applying adhesive material to a first web in a pattern corresponding to the seams of a garment; folding a second web of material along the mid-line of the web; placing said second web upon the first web with the folded edge of the second web aligned with one edge of said first web; folding the uncovered half of the first web over the folded second web; pressing the first and second webs together so that the adhesive material on said first web adheres to said second web; and separating a garment from said webs by cutting said webs in a pattern corresponding to the outline of half of a garment.

3. A method of producing garments such as gowns and the like from continuous webs of garment material, comprising the steps of: applying glue to a first web in a pattern corresponding to the seams of the garment; cutting a semicircular opening in said first web, oriented with respect to the pattern of glue so as to be the neck opening of said garment; cutting a plurality of aligned slits in a second web, said slits being perpendicular to the edges of said second web; applying tape across the slits; cutting between said slits to complete a transverse cut across said second web, said second web being held together by said tape; squeezing said first and second webs together so that the glue on the first web adheres to the second web; and cutting said first and second webs in a pattern corresponding to the outline of said garments to remove the garment from said first and second webs.

4. A method of producing garments such as gowns and the like from continuous webs of garment material, comprising the steps of: applying adhesive material on a first web in a pattern corresponding to the seams of a first garment and two halves of a second garment; folding a second web along the mid-line of the web and placing said second web upon said first web with the folded edge of said second web aligned with one edge of said first web; folding the uncovered half of said first web over said second web and pressing said first and second webs together so that the adhesive material of said first web adheres to said second web; and separating said first and second garments from said first and second webs by severing said first and second webs in a pattern corresponding to the outline of two halves of a garment.

5. A method of producing garments such as gowns and the like from continuous webs of garment material, comprising the steps of: applying adhesive material on a first web between two selected points in a pattern corresponding to the seams of a first garment and two halves of a second garment, said two halves being positioned along each edge of said first web so that the edges of said first web correspond to the opening of said second garment; folding a second web along the mid-line of the web and placing said second web upon said first web with the folded edge of said second web aligned with one edge of said first web; folding the uncovered half of said first web over said second web and pressing said first and second webs together so that the adhesive material of said first web adheres to said second web; and separating said first and second garments from said first and second webs by cutting said first and second webs in a pattern corresponding to the outlines of two halves of a garment.

6. A method of producing garments such as gowns and the like from continuous webs of garment material, comprising the steps of: imprinting glue on a first web between two selected points in a pattern corresponding to the seams of a first garment and two halves of a second garment, said first and second garments being inverted with respect to each other and said two halves positioned along each edge of said first web so that the edge of said first web corresponds to the vertical opening of said second garment; folding a second web along its mid-line and placing the folded second web upon said first web with the folded edge of the second web aligned with one edge of said first web; folding the uncovered half of said first web over said folded second web and pressing said first and second webs together so that the glue on said first web adheres to said second web; and separating said first and second garments from said first and second webs by cutting said first and second webs in a pattern corresponding to the outlines of two halves of a garment.

7. A method of producing garments such as gowns and the like from continuous webs of garment material, comprising the steps of: perforating a first web and a second web with a plurality of equally spaced indexing holes; imprinting glue on the space between each set of two indexing holes on the first web, said glue being imprinted in a pattern corresponding to the seams of a first garment and two halves of a second garment, said first and second garments inverted with respect to each other and said two halves positioned along each edge of said first web so that the edge of said first web corresponds to the vertical opening of said second garment; folding a second web along its mid-line and placing the folded second web upon said first web with the folded edge of the second web aligned with one edge of said first web; folding the uncovered half of said first web over said folded second web and pressing said first and second webs together so that the glue on said first web adheres to said second web; and separating said first and second garments from said first and second webs by cutting said first and second webs in a pattern corresponding to the outlines of two halves of a garment.

8. A method of producing garments such as gowns and the like from continuous webs of garment material, comprising the steps of: perforating a first web and a second web with a plurality of equally spaced indexing holes of a size corresponding to the neck space of each garment; imprinting glue on the space between each set of two indexing holes on the first web, said glue being imprinted in a pattern corresponding to the seams of a first garment and two halves of a second garment, said first and second garments inverted with respect to each other and said two halves positioned along each edge of said first web so that the edge of said first web corresponds to the vertical opening of said second garment and each half of the second garment has a side adjacent to a side of the first garment; folding a second web along its mid-line and placing the folded second web upon said first web with the folded edge of the second web aligned with one edge of said first web; and with the indexing holes of the second web centered on a line perpendicular to the edge of the first web and passing through the center of the indexing holes in the first web; folding the uncovered half of said first web over said folded second web and pressing said first and second webs together so that the glue on said first web adheres to said second web; and separating said first and second garments from said first and second webs by cutting said first and second webs in a pattern corresponding to the outlines of two halves of a garment.

9. Apparatus for producing garments such as gowns and the like from two continuous webs of garment material, comprising the combination of: means for supplying and driving a first web and a second web separately through said apparatus; first cutting means subsequent to said supplying and driving means for cutting a plurality of aligned transverse slits in said second web; a tape applicator, subsequent to said first cutting means, positioned to apply tape across said slits; second cutting means subsequent to said tape applicator, for cutting between said slits completing a transverse cut across said second web; printing rolls subsequent to said supplying and driving means for applying adhesive material to said first web in a pattern corresponding to the seams of a garment; means for pressing said first web against said second web subsequent to said second cutting means and printing rolls; and third cutting means, subsequent to said pressing means for severing said first and second webs in a pattern corresponding to the outline of a garment.

10. Apparatus for manufacturing garments such as gowns and the like from two continuous webs of garment material comprising the combination of: supply and driving means for feeding a first web and a second web through said apparatus; a first pair of rolls, subsequent to said supplying and driving means, having embossments on the surface of one of said first pair of rolls in a pattern corresponding to the seams of said garment, said embossments being positioned to contact first a source of adhesive substance and then said first web; first folding means, subsequent to said supply and driving means, for folding said second web along its mid-line; a second pair of rolls, subsequent to said first pair of rolls and said folding means for positioning the folded second web upon said first web with the folded edge aligned with one edge of the first web; second folding means, subsequent to said second pair of rolls for folding the uncovered half of the first web over said folded second web; and a third pair of rolls subsequent to said second folding means, having knives affixed to one of said third pair of rolls arranged in a pattern corresponding to the outline of two halves of a garment; said knives being positioned to cut two completed garments from said first and second webs on each revolution.

References Cited in the file of this patent
UNITED STATES PATENTS

| | | |
|---|---|---|
| 2,657,159 | Naham | Oct. 27, 1953 |
| 2,688,582 | Phair | Sept. 7, 1954 |
| 2,950,482 | Withers | Aug. 30, 1960 |